April 7, 1959 D. LOEV 2,881,412

SHIFT REGISTERS

Filed April 29, 1954 2 Sheets-Sheet 1

INVENTOR
DAVID LOEV
BY
Laurence R. Brown
ATTORNEY

INVENTOR
DAVID LOEV
BY
Laurence R. Brown
ATTORNEY

United States Patent Office 2,881,412

Patented Apr. 7, 1959

2,881,412

SHIFT REGISTERS

David Loev, Philadelphia, Pa., assignor to Burroughs Corporation, Detroit, Mich., a corporation of Michigan Application April 29, 1954, Serial No. 426,531

6 Claims. (Cl. 340—174)

This invention relates to storage systems of the type used in electronic computer circuits, and more particularly it relates to shift registers.

Shift register circuits have been used in electronic digital computers for storing and manipulating binary information. Different types of shift registers used in these systems are described in the Electronic Engineering article entitled "An Electronic Digital Computer" published in December 1950 by A. D. Booth. Conventional magnetic shift register circuits have been extensively used in the manner described in this article. Such magnetic shift registers use magnetic materials having substantially rectangular hysteresis characteristics. These switching elements may be caused to remain in one of two permanent magnetic remanence conditions after being driven into saturation by current pulses at a transformer winding about the cores. The two resulting states of magnetic remanence provide convenient static storage of binary information. When an element is in one remanent condition, little voltage will be induced in windings about the core when a saturating magnetic flux of the polarity tending to establish the same remanence condition is applied. However, when the element is interrogated by a saturating flux opposite in polarity, a high output voltage is induced in the windings. In this manner the static storage state may be determined.

To couple these elements into a serial shift register circuit, the stored information must be read out of one element before a further bit of information can be stored therein. Therefore, a delay is required in shifting the stored signal from one element to the next. This delay may be realized by inserting a temporary storage element as an idler core between two storage elements. Conventional magnetic shift registers constructed in this manner, however, are not as efficient as deemed desirable for storing binary information since two storage elements are required for each bit.

Accordingly, it is a principal object of the present invention to reduce the number of storage elements required in a shift register for storing the binary information.

A general object of the invention is to provide improved shift register systems capable of storing information more efficiently.

Another object of the invention is to provide an improved method of operating shift registers in order to permit more efficient storage of information.

The number of storage elements necessary in a shift register is reduced in accordance with the present invention by providing a new method of operation. Thus, the shift register elements are broken up in blocks of $n$ elements, where $n$ is an integer greater than two, and the information is separately shifted from one element to another in an order sequence of the time periods $t_1, t_2 \ldots t_n$. This time sequence provides shifting of information along the shift register within the respective blocks of elements. To enable the retention of stored information without destruction as it is shifted along the register, the information is entered into only $n-1$ elements of each block during the transit of information along the storage elements within the block. Thus, for each sequence of shift pulses there is provided only one idler storage element in which the temporary storage or delay function may be performed. This means that for three shifting steps in time sequence, only one idler element is necessary with two memory elements, which results in substantial increase in storage efficiency of the shift register by means of a saving in the number of storage elements. The number of elements required to store each bit of information may be mathematically expressed in the formula $$1+\frac{1}{t-1}$$

where $t$ is the number of sequential timing periods used in operating the shift register. This expression applies when the shift register becomes long, and for shorter shift registers an even greater improvement in storage efficiency results. Therefore, the number of cores per bit is always less than two when $t$ is greater than two.

Operation of shift registers in accordance with these principles is discussed in more detail with reference to the accompanying drawing, in which.

Figure 1:
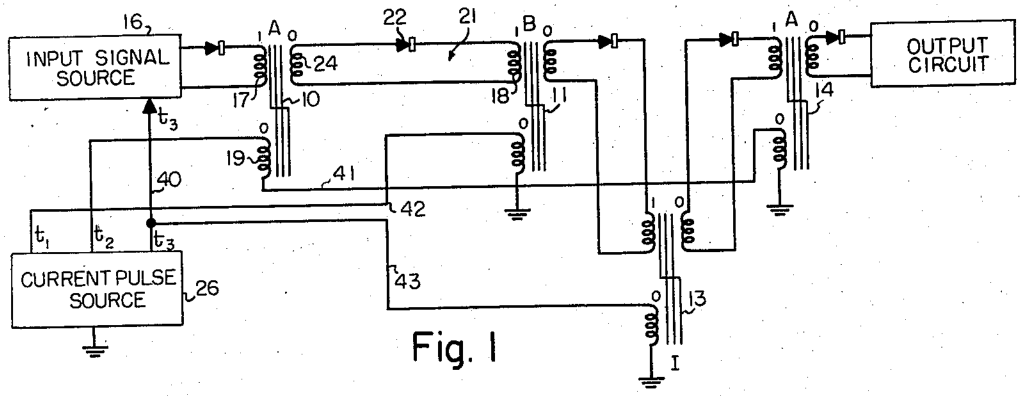
Fig. 1 is a schematic circuit diagram of a magnetic shift register constructed in accordance with the invention.

Throughout the drawing, like reference characters are used to designate similar components in order to facilitate comparison of the several figures. Wherever possible, those well known elements, whose details are not of themselves a part of the described invention, are shown only in block diagram form in order to point out more particularly the novel features contributed by the invention.

Referring now to the shift register system of Fig. 1, a plurality of magnetic storage elements 10, 11, 13, and 14 are connected in a cascade circuit for transferring stored information serially from one element to another. In this shift register, the elements are coupled in blocks of three elements each comprising an A and a B memory element and one idler element I. Each of the elements in the circuit operates in the conventional manner described in connection with the element 10, which receives at the input winding 17 input signals representing binary information from the input signal source 16. The input signal source 16 may be a preceding binary storage element, if desired. The input signals arrive during the time sequence period $t_3$ at the direction of timed current pulses derived from the pulse source 26, which are passed along lead 40 to gate input signals from source 16 to the input winding 17. The pulse generator 26 may comprise a cycle distributor circuit or a three step pulse counter circuit. Any circuit will suffice which establishes current pulses suitable for driving the storage elements in a time sequence during the three periods $t_1$, $t_2$ and $t_3$. Circuits of this type are well known in the art and their details form no part of the present invention.

The binary "1" notation at the input winding 17 indicates that the presence of input signals will establish a "1" storage condition, which overcomes the cleared storage condition "0" established by means of the interrogation winding 19 at the time prior information is shifted out of the storage element 10. The reset operation afforded by interrogation is designated by the "0" notation adjacent to the interrogation winding 19. This is accomplished by current pulses of source 26 passed along lead 41 during the time sequence period $t_2$. Upon interrogation of element 10 the information is shifted to the successive storage element 11 by means of a transfer loop 21. The diode 22 coupled in series with one of the leads of transfer loop 21 is poled in such a direction that the output winding 24 of element 10 only reads a "1" into the input winding 18 of element 11 when element 10 is shifted from a "1" storage state to the "0" storage state as indicated by the "0" notation. Likewise the shift windings of elements 11 and 13 are interrogated in the time sequence periods $t_1$ and $t_3$ by current pulses passing along the respective leads 42 and 43. In this general manner, information is passed from element to element along the shift register as each storage element is individually interrogated.

In accordance with this embodiment of the present invention the three adjacent magnetic storage elements B, A and I of each block are respectively interrogated by current pulses arriving in three chronologically ordered time sequence periods $t_1$, $t_2$ and $t_3$ to pass a bit of stored information into the succeeding block. Thus, within a single block of three adjacent storage elements, a time interval of three interrogation pulses is required to read a single bit of information into the block or conversely to read a single bit of information out of the block. There is stored in the three elements of a block, however, two bits of information so that only one idler element is required for providing the necessary delay function.

The block of elements A, B and I is arranged to store information in two of the memory elements A and B and to operate one of the three elements I as a delay element. The delay function is performed by different elements progressively at different time periods, but for illustrative purposes the single element I is designated to represent the register condition at the time period after $t_3$ and before $t_1$ when information is stored in memory elements A and B. Thus, the input signal is inserted into element 10, at the time $t_3$ where it remains while the next sequential current pulse from the sequential current pulse source 26 at time $t_1$ serves to clear element 11. Therefore, at the time period $t_2$ element 10 is interrogated and shifts the information to the cleared element 11, thereby clearing element 10 to receive a further input bit of information at the succeeding time period $t_3$. This embodiment therefore advances one bit of information in the block of three elements with a sequence of three shift pulses.

Figure 2:
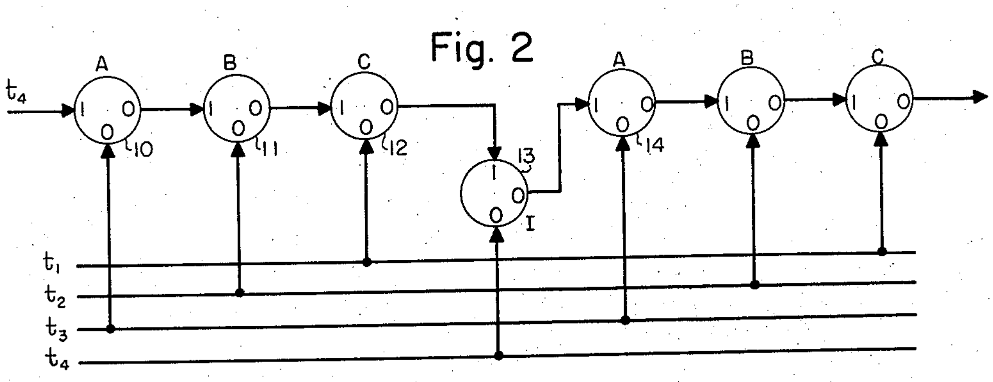
Figs. 2 and 3 are logical block diagrams of further shift registers embodying the invention.

In Fig. 2 there is shown logically a further magnetic shift register embodiment which is operated with a sequence of four shifting pulses occurring at times $t_1$, $t_2$, $t_3$ and $t_4$ and wherein at time $t_4$ the information stored in an idler core such as core 13 or some other input signal source is read into the A core of the next group of storage cores. Each of the magnetic elements is logically represented by a circle with input windings being represented by arrows and output windings by leads, and including the same binary notation as described in connection with Fig. 1. It is seen in this embodiment that only one idler element I is required for three memory elements A, B, C, and that an even greater storage efficiency is accomplished at the expense of a further sequential time period necessary for reading a bit of information into or out of the register. This general concept can be expanded so that any number of elements in blocks of $n$, where $n$ is greater than two, may be used to retain stored information in $(n-1)$ elements of the block, and each bit of information may be progressively read into or out of the block with a sequence of $n$ timed pulses. It is also evident that the interrogation of adjacent elements in each block is effected in inverse order to the direction of information transit through the elements.

Figure 3:
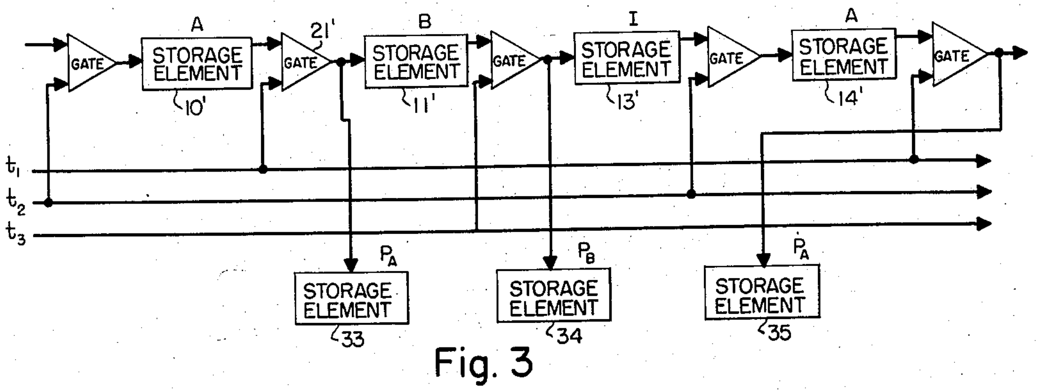

Although this method of operating shift registers has particular advantage when used with magnetic storage elements, the system of Fig. 3 illustrates the manner of operating any general type of shift register in accordance with the present invention. In the embodiment of Fig. 3 the combination of a storage element and a gate is required for performing the storage and shifting operations. The storage elements may be, for example, bistable state multivibrator circuits which are dynamically held in one or the other storage condition. In this manner a gating circuit is necessary between cascade coupled storage elements so that the dynamically stored information may be passed from one storage element to another in the form of a trigger pulse for dynamically setting the succeeding stage. The gating is effected by the action of sequentially presented shifting or gating pulses $t_1$, $t_2$ and $t_3$. In the magnetic shift register hereinbefore described the magnetic elements themselves operate both as the binary storage element and the gating circuit.

The operation of the circuit shown in Fig. 3 corresponds to that of the magnetic shift register of Fig. 1. Thus, storage elements 10', 11' and 13' are connected in a block of three elements in the same general manner, and the intermediate gating circuits perform the general function of the transfer coupling loop 21 of Fig. 1 in the presence of an interrogation signal $t_1$, $t_2$ or $t_3$.

Serial input-serial output operation of the shift registers has been assumed heretofore. However, serial input-parallel output operation is different from that in conventional shift registers and therefore is discussed in connection with the parallel read-out elements 33, 34 and 35. After the shift register is filled, a sequence of two pulses is required for parallel read-out. At the time $t_3$ half the stored information is read into the parallel read-out register elements $P_B$, and at the subsequent time $t_1$ the remaining information is read into the elements $P_A$.

Figure 4A:
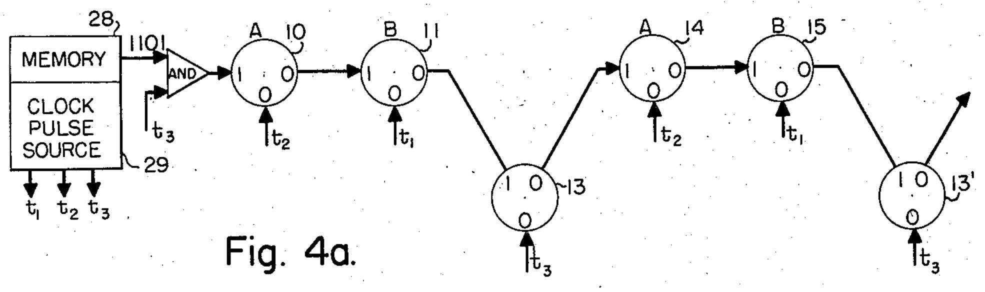
Fig. 4 contains a logical diagram of representative shift register systems and an accompanying chart illustrating the step by step method of operation of shift registers in accordance with the principles of the present invention.
Figure 4B:
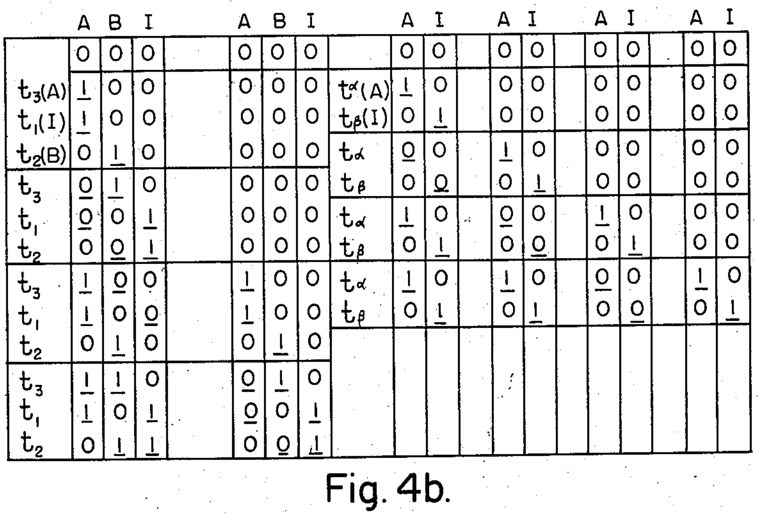

A step by step discussion of the method of passing information along shift register circuits operated in the manner of the invention is outlined in connection with Fig. 4. In Fig. 4*a*, a logical shift register system for operation with three sequential shifting pulses $t_1$, $t_2$ and $t_3$ is shown in connection with a memory circuit 28 from which the binary word 1101 may be derived for storage in the register. Memory device 28 may be, for example, a magnetic drum which includes a timing track or some other clock pulse source 29 which provides the required sequence of shifting signals during the time periods $t_1$, $t_2$ and $t_3$. The process of entering the word into the shift register is indicated in the chart of Fig. 4*b* wherein the respective columns designate the information retained in the memory elements 10 through 15, and the rows indicate the sequential timing at which the different events take place. For example, A, B and I indicate respectively the cores 10, 11 and 13, of which core 13 may be considered an idling core, or some other group of cores A, B and I such as 14, 15 and 13'.

It is assumed that the register has been cleared to 000000. The word 1101 is read-in in serial fashion, one element at a time, during successive $t_3$ time periods. The notation $t_3$ (A) therefore designates that information is read into elements A with pulses arriving at time $t_3$, and likewise $t_1$ (I) and $t_2$ (B) respectively indicate information read into elements I and B of the shift register. Thus, the chart shows the sequential steps in entering the word 1101 to fill the register in the final form 011001. The word is entered into the register in ten sequential steps but is not available for output until after twelve sequential pulses have taken place. In the example chosen, the word enters the shift register with the least significant digit first, although it is obvious that one may, if desired, enter with the most significant digit first. The stored word may subsequently be read out of the register in the same manner, one bit at a time, with further groups of three successive shift pulses $t_3$, $t_1$ and $t_2$. Each bit of stored information is underlined in the chart so that the process of storing the information in the register may be more readily followed, and will not become confusing because of the "0's" contained in the idler elements. In order to fill this shift register with four bits of information, twelve sequential shift pulses are necessary, and six storage elements are required.

Should the information be read out of the register after the storage of only four bits, the information could be taken directly from element 15 without passing by way of the idler element 13', thereby resulting in an even greater storage efficiency. However, in the general case of a long shift register, three elements are needed in order to store each two bits of information.

Figure 4C:
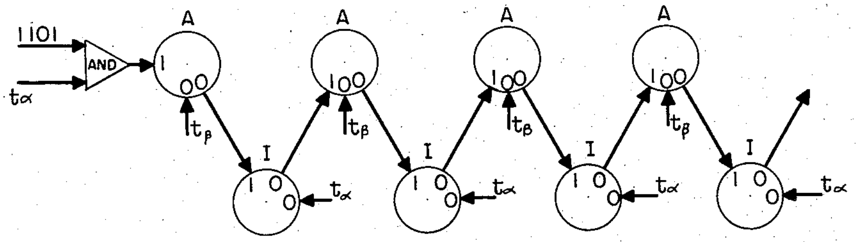

For purposes of comparing the operation of this circuit with the conventional shift register circuits, consider the logical diagram of Fig. 4*c* wherein a conventional shift register is shown. The separate elements of this register operate in a manner identical to those above described, however, the information is alternately passed from one storage element to an idler element by only two sequential shifting pulses so that two elements are required for the storing of each bit of information. In this manner it is seen in the chart of Fig. 4*b* that eight elements are required to store the binary word 1101 in the final form 01010001, which is entered during a time period of eight sequential shifting pulses. Therefore, in accordance with the present invention more efficient storage of information may be effected by entering the same number of bits in less elements of a shift register system in any application where it is possible to read information in and out at a slower rate.

Those features of the invention which are believed to distinguish the novel aspects thereof are set out with particularity in the appended claims.

I claim:

1. A magnetic shift register system comprising in combination; a plurality of magnetic storage elements each capable of assuming either of two stable states of magnetic remanence coupled in cascade circuit in blocks of three elements, each block comprising A and B memory elements and one idler element I coupled in the cascade circuit in the specified order A, B, I; and means successively interrogating the I, B and A elements in that order in time sequence periods to advance a bit of information along the shift register in the direction A, B and I.

2. A magnetic shift register comprising in combination one or more series-connected unitary blocks each of which comprises at least three magnetic storage elements, each element being capable of assuming either of two stable states of magnetic remanence; coupling means for connecting the elements of each block in series arrangement; means for placing binary information into the first element of the first block; and means for interrogating individually each element of each block at a correspondingly different time in successive order in reverse direction, the last element of each block being interrogated first and the first element being interrogated last, thereby to transfer information from each element of the block in a forward direction in step-by-step manner.

3. A shift register system comprising in combination; a plurality of binary storage elements in series-coupled blocks of N elements each, each block comprising elements A, B, . . . N coupled in series in that order; means for inserting a bit of binary information in the A element of the first block; means for successively reading out the information stored in the elements of each block and for shifting the read-out information along the register in move-up fashion starting at the N element, the A element being the last to be read out; and means for inserting a bit of binary information in the A element of each block concurrently with the read-out of the N element, the information inserted in the A elements of those blocks other than the first being that information which is read out of the N element of the preceding block.

4. A shift register comprising one or more series-coupled groups of storage elements, each element capable of assuming either of two stable states, each group comprising $n$ primary storage elements connected in cascade and one auxiliary storage element connected to the last primary element of the group, where $n$ is an integer larger than 1; means for inserting a bit of binary information into the first primary element of the first group; means effective at a selected time period for reading stored information out of the auxiliary element of each group and into the first primary element of the following group; means effective at a following time period for reading stored information out of the last primary element of each group and into the auxiliary element of that group; means effective at successively different time periods for reading stored information successively out of the remaining primary elements of each group in reverse order moving from the next-to-last element toward the first and for transferring said read-out information forward to the next element in successive move-up fashion; and means effective at an $(n+1)$th time period for inserting new information into the first element of the first group.

5. Apparatus as claimed in claim 4 wherein said primary and auxiliary storage elements are magnetic cores each capable of assuming either of two stable states of magnetic remanence.

6. Apparatus as claimed in claim 5 wherein said means for reading information out of said cores comprise sources of shift current pulses, shift windings on said magnetic cores, and transfer links coupling said cores.

References Cited in the file of this patent

UNITED STATES PATENTS

| | | |
|---|---|---|
| 2,652,501 | Wilson | Sept. 15, 1953 |
| 2,683,819 | Rey | July 13, 1954 |
| 2,708,722 | An Wang | May 17, 1955 |

OTHER REFERENCES

IRE National Convention Record, part 7, March 23, 1953, pp. 38–42.

Journal of App. Physics, vol. 21, January 1950, pp. 49–54.

"Static Magnetic Memory" (Kincaid), Electronics, January 1951, pp. 108–111. (Figure 8, page 111 relied on.)